United States Patent Office 2,755,440
Patented July 17, 1956

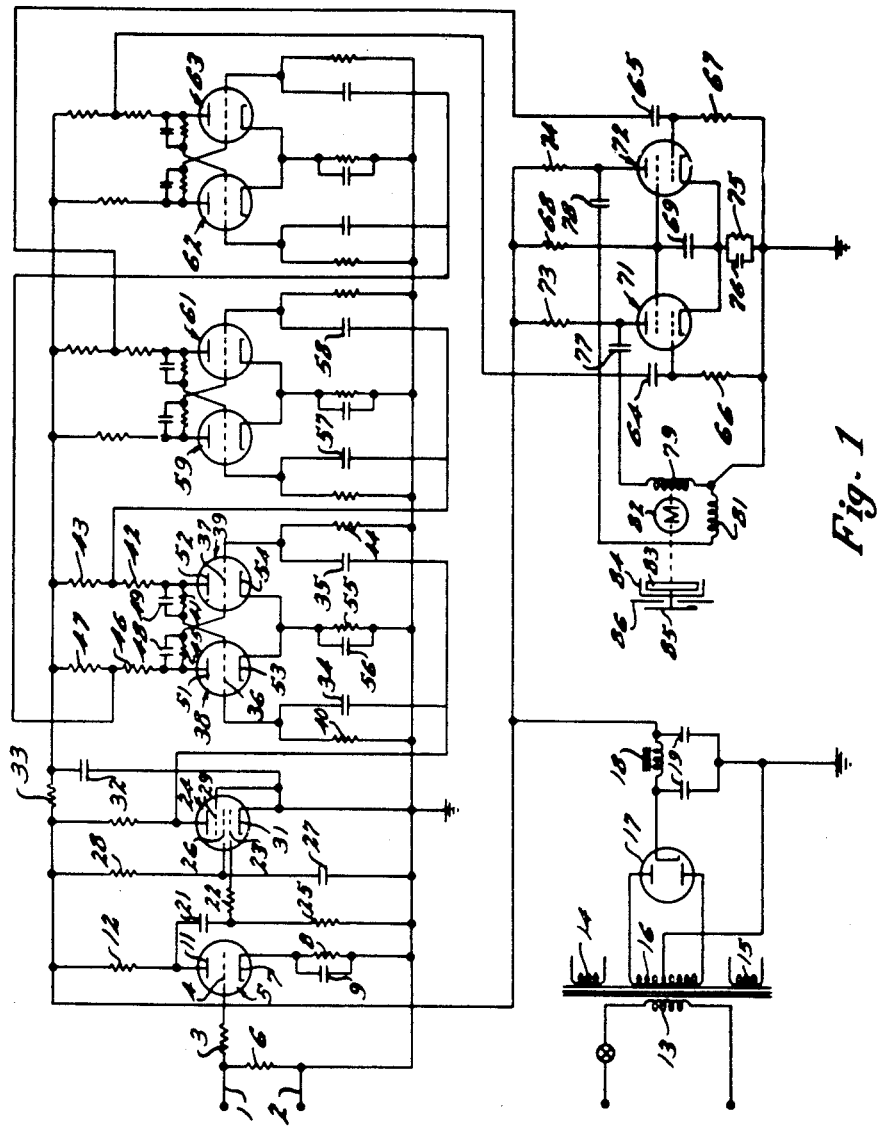

2,755,440
POLYPHASE SUPPLY CIRCUIT AND FREQUENCY METER

John H. Andresen, Jr., Port Washington, and Edward Kasner, Brooklyn, N. Y., assignors to Kolisman Instrument Corp., Elmhurst, N. Y., a corporation of New York Application November 5, 1948, Serial No. 58,566, now Patent No. 2,604,520, dated July 22, 1952, which is a division of application Serial No. 704,512, October 19, 1946, now Patent No. 2,472,507, dated June 7, 1949. Divided and this application March 21, 1952, Serial No. 277,884

4 Claims. (Cl. 324—78)

This application is a division of our Patent No. 2,604,520 issued July 22, 1952, and Patent No. 2,472,507 issued June 7, 1949, and relates to an improved form of electronic circuit for producing a polyphase output from a single phase input and more particularly to a frequency meter utilizing such a circuit to measure the input frequency.

One object of the invention is the provision of a frequency meter for measuring the frequency of a single phase input from a polyphase frequency meter fed by an electronic circuit producing a two-phase output from a single phase input with the individual phases of the output substantially equalized over a wide range of frequency.

Another object of this invention is the provision of a frequency meter for measuring the frequency of a single phase input from a polyphase frequency meter fed by an electronic circuit producing a two-phase output from a single phase input with the output frequency a sub-multiple of the input frequency.

Another object of the invention is a simplified electronic circuit for producing a two-phase output from a single phase input with the individual phases of the output substantially equalized over a wide range.

Another object of the invention is a frequency meter embodying a polyphase synchronous motor driving a drag cup tachometer with the motor fed from a single phase source whose frequency is to be measured through an electronic frequency divider.

A further object is a frequency meter in accordance with the preceding object in which the electronic circuit provides a polyphase output having a frequency which is a sub-multiple of the input frequency to extend the range of frequency over which the meter is responsive.

Other objects and features of the invention will be readily apparent to those skilled in the art from the specification and appended drawings illustrating certain preferred embodiments in which:

Figure 1 is a wiring diagram of an electronic circuit and frequency meter according to the present invention in which the frequency of the single phase input is divided in the two phase output which feeds a synchronous motor driving a drag cup tachometer indicator.

Figures 2, 3, 4, 5 and 6 are representations of the wave form outputs of various tubes of the circuit of Figure 1.

Figure 7:
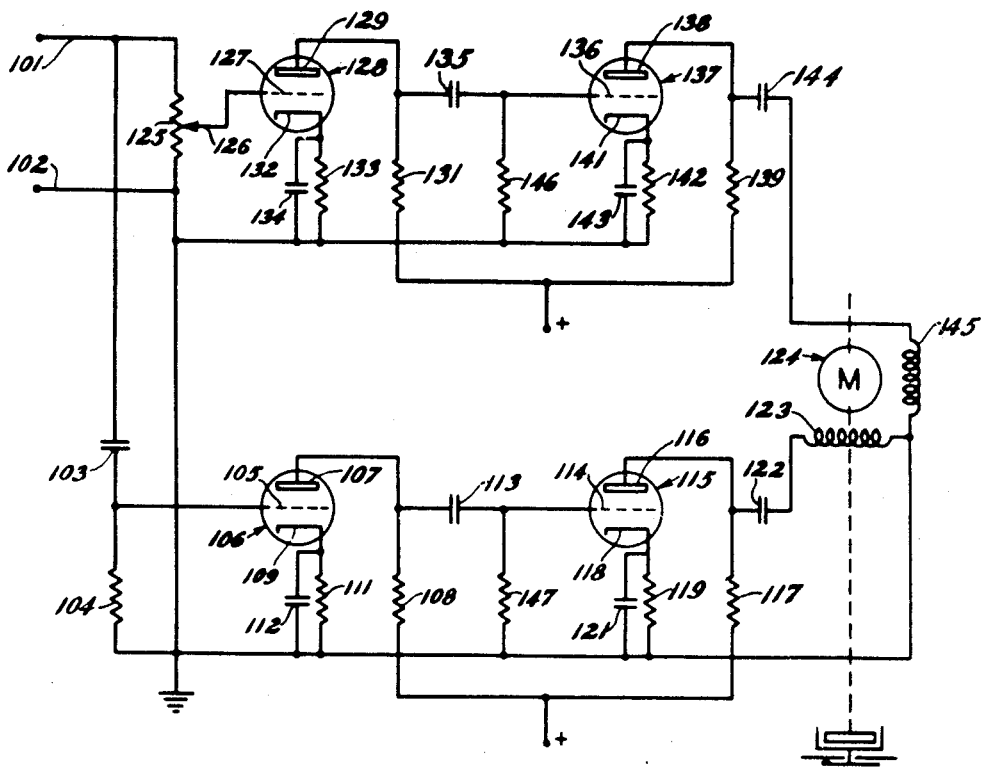
Figure 7 is a wiring diagram of a simplified form of frequency meter and electronic circuit providing for the two phase output from the single phase input but without frequency division.

In the diagram of Figure 1, the single phase input is applied at 1 and 2 and is fed through a protective resistor 3 to the control grid 4 of a voltage amplifying triode 5. The wire 2 is connected to ground and across 1 and 2 is provided a grid resistor 6. The cathode 7 of the triode 5 is connected to ground through cathode resistor 8 and by-pass condenser 9. The anode 11 of the triode 5 is connected to the supply through the load resistor 12.

The supply is provided from an alternating current source to the supply transformer primary 13 having secondary filament windings 14 and 15 and a main winding 16 supplying direct current through the rectifier tube 17 and the filter circuit represented by the inductance 18 and condensers 19.

The amplified output of the triode 5 is connected through a coupling condenser 21 and grid limiting resistor 22 to the control grid 23 of a pentode 24, the grid resistor being indicated at 25. The pentode 24 and its circuit serve as an amplifier-limiter which not only further amplifies the output of triode 5 but produces a square wave output. The pentode 24 has a screen grid 26 connected through by-pass condenser 27 to ground and through the voltage dropping resistor 28 to the supply. The suppressor grid 29 of the pentode 24 is connected to the cathode 31 and these are connected to ground and through a condenser 32 to the supply, the condenser 32 and resistor 33 constituting a decoupling filter to suppress alternating current on the dividers to be hereinafter described.

The output of the pentode 24 is fed through coupling condensers 34 and 35 to the grids 36 and 37 of triodes 38 and 39 forming part of an Eccles-Jordan frequency divider circuit. This circuit includes resistors 40, 41, 42, 43 and resistors 44, 45, 46, 47, which resistors form voltage dividing circuits which impress the grid bias on the tubes 38, 39. Condensers 48, 49 parallel the resistors 45 and 41. Anodes 51 and 52 of tubes 38 and 39 are connected to the supply through the resistors 46, 47 and 42, 43, respectively. The cathodes 53 and 54 are connected to ground through cathode resistor 55 and by-pass condenser 56.

The output of tube 39 is fed through coupling condensers 57 and 58 to the grids of tubes 59, 61 forming with their circuit connections a second Eccles-Jordan frequency divider circuit similar to that previously described in detail for the circuit embodying the tubes 38 and 39. Similarly, the output of tube 38 is fed to a third Eccles-Jordan circuit embodying the tubes 62 and 63. The outputs of tubes 61 and 63 are suitably amplified and fed to the frequency responsive meter.

The amplifying circuit is represented by the coupling condensers 64 and 65, grid resistors 66 and 67, screen grid resistors 68, screen grid by-pass 69, tetrodes 71 and 72, load resistors 73 and 74, cathode resistor 75 and cathode by-pass condenser 76. The amplified output of tubes 71 and 72 is fed through coupling condensers 77 and 78 to the two phase windings 79 and 81 of a synchronous motor 82 driving a permanent magnet 83 within a conducting drag cup 84 which carries a pointer 85 cooperating with a dial 86. The drag cup and its shaft are provided with a biasing spring, not shown, limiting its displacement.

In the operation of the electronic circuit and of the frequency meter of which it forms a part, the input frequency applied at 1 and 2 may have any wave form but the unknown frequency should be periodic. This single phase input is amplified by the tube 5 and the output fed to the amplifier-limiter tube 24 whose output is further amplified and is in the form of a rectangular wave as shown in Figure 2, regardless of the input wave form. The frequency of the output of tubes 38 and 39 is one-half that of the input frequency and is in the form illustrated in Figures 3 and 4, being 180° apart. This frequency division is a well known characteristic of the Eccles-Jordan circuit which tends to drive one tube toward cutoff and the other toward saturation. With the application of the square wave form input, sharp pulses are applied to the grids. When a positive pulse appears, the tube in the circuit momentarily conducting undergoes no change. The non-conducting tube attempts to conduct but is prevented from doing so by the negative bias impressed upon it by the other tube. When a negative pulse appears at the grids, both tubes are momentarily driven to cutoff. The charges existing on the condensers 48 and 49 now exert control of the circuit and the higher charge across the condenser at the initially conducting tube causes the initially non-conducting tube to conduct heavy and drive the initially conducting tube to cutoff. One input cycle causes one transfer of conduction to produce the one-half frequency output.

The Eccles-Jordan circuits formed by tubes 59, 61 and 62, 63 further divide the output of the tubes 38, 39. The outputs of tubes 59, 61 are 180° apart and the outputs of tubes 62 and 63 are 180° apart. However, the outputs of the tubes 61 and 63 are only 90° apart as is shown by the wave form of Figures 5 and 6, since the initial 180° out of phase relation of the wave forms of Figures 3 and 4 becomes 90° upon the frequency division. The output of tubes 61 and 63 is amplified in the circuit including the tubes 71 and 72 and feeds the two phase synchronous motor 82 which thus rotates at a synchronous speed of one-quarter the input frequency.

The magnetic drag cup tachometer has a direct reading dial indication corresponding to the speed of the motor 82. The permanent magnet 83 is driven in synchronism with the motor 82 and sets up eddy currents in the drag cup motor 84 producing a shaft torque proportional to the speed of magnet rotation. This torque acting against a spring in known manner produces a displacement of the drag cup shaft proportional to the torque. The pointer 85 mounted on the shaft indicates on the dial 86 the input frequency, the dial 86 bearing indicia calibrated in cycles per second.

The circuit, according to the present invention, not only provides for a two phase output from a single phase input but subdivides the input frequency to any degree desired since any number of frequency dividers may be placed in advance of the divider circuit represented by the tubes 38, 39 to subdivide the frequency to any desired degree. Hence, the range of the frequency meter is independent of the physical limitations of the synchronous motor. Thus, a synchronous motor having an accurate frequency response over a range of 10 to 150 cycles per second may, by a frequency subdivision of four, be utilized to operate a frequency meter indicating from 40 to 600 cycles per second and with further division, the range can be further extended as desired. The use of the two phase synchronous motor is greatly preferred for its efficiency and good starting characteristics.

To secure the proper phase relation for continuous motor rotation in the same direction, it is desired that the firing order of the last dividers shall be consistent. Variation in the firing order of the dividers feeding thereto is immaterial since the reversal of both phases does not effect the direction of rotation. To secure the consistent order of firing in the last two dividers of the circuit, their plate load resistors are unbalanced so that the sections with the lower load resistances are always cut in first to insure consistency in the firing order and proper rotation of the motor at all times.

The frequency meter and circuit of Figure 7 is a simplified form which may be utilized over a range of frequencies within the physical limitations of the motor, no provision being made for frequency subdivision in the output. In this circuit the single phase input is applied at 101, 102 and across the input is connected a condenser 103 and resistor 104 with the impedance of the condenser 103 high with respect to the resistor 104 so as to secure a phase shift of almost 90° to the grid 105 of tube 106. The anode 107 of tube 106 is connected through load resistor 108 to the supply and the cathode 109 is connected through cathode resistor 111 and by-pass condenser 112 ground. The output of tube 106 is connected through coupling condenser 113 to the grid 114 of tube 115 whose anode 116 is connected through load resistor 117 to the supply and whose cathode 118 is connected through cathode resistor 119 and by-pass condenser 121 to ground. The output of tube 115 is fed through a coupling condenser 122 to one phase 123 of a two phase synchronous motor 124.

Potentiometer 125 is connected across the input parallel with 103, 104 and has an adjustable tap 126 feeding the grid 127 of tube 128 whose anode 129 is connected through load resistor 131 to the supply and whose cathode 132 is connected through cathode resistor 133 and by-pass condenser 134 to ground. The output of tube 128 is fed through coupling condenser 135 to the grid 136 of tube 137 whose anode 138 is connected through load resistor 139 to the supply and whose cathode 141 is connected through cathode resistor 142 and by-pass resistor 143 to ground. The output of tube 137 is fed through coupling condenser 144 to the second phase 145 of the synchronous motor 124. 146 and 147 are grid resistors for tubes 137 and 115.

The reactance of condenser 103 is made high with respect to the resistance 104 to secure substantially at 90° phase shift to feed the grid of tube 106. The reactance of condenser 135 is high at low frequency with respect to the reactance of condenser 113. As the input frequency increases, the reactance of condenser 135 has a greater effect to increase the grid voltage of tube 137 than does the change in reactance of condenser 113 upon the grid of tube 115. In one embodiment of the present invention, the following components and tubes were used where the numerals referred to the elements of Figure 7:

| | |
|---|---|
| Capacitor 103 | 0.01 microfarad. |
| Resistor 104 | 100 K. |
| Tube 106 | 6J5 pre-amplifier. |
| Resistor 108 | 100 K. |
| Resistor 111 | 2.7 K. |
| Capacitor 112 | 8 microfarads. |
| Capacitor 113 | 1.0 microfarads. |
| Tube 115 | 6U6 power amplifier. |
| Resistor 117 | 5000 ohms. |
| Resistor 119 | 250 ohms. |
| Capacitor 121 | 20 microfarads. |
| Capacitor 122 | 100 microfarads. |
| Resistor 125 | 100K potentiometer. |
| Tube 128 | 6J5 pre-amplifier. |
| Resistor 131 | 100 K. |
| Resistor 133 | 2.7 K. |
| Capacitor 134 | 8 microfarads. |
| Capacitor 135 | Value to be selected for proper equalization as dictated by the frequency range used. |
| Tube 137 | 6U6 power amplifier. |
| Resistor 139 | 5000 ohms. |
| Resistor 142 | 250 ohms. |
| Capacitor 143 | 20 microfarads. |
| Capacitor 144 | 100 microfarads. |
| Resistor 146 | 0.5 meg. |
| Resistor 147 | 0.5 meg. |

This effect serves to render the two phase output of the electronic circuit more nearly equal over a wide frequency range. Without this effect, upon increase in frequency, the output of tube 115 would increase without increase in the output of tube 137 to unbalance the input to the motor.

In the operation of the circuit, the adjustable tap 126 is located to equalize the inputs to tubes 128 and 106 at minimum input frequency. As the input frequency is increased from the minimum, the reactance of condenser 103 decreases and this results in an increased grid voltage on tube 106 which is in turn reflected by an increased voltage on the grid of tube 115 with a corresponding increase in the input to phase 123 of motor 124. To counteract this unbalance, the increase in frequency also lowers the initially high reactance of condenser 135 to increase the voltage on the grid of tube 137 and, hence, increase the input to phase 145 to keep it more nearly in step with the increase to 123 at the higher frequencies. The operation of the motor and drag cup tachometer to indicate frequency is the same as described in the preferred form of the invention. All of tubes 106, 115, 128 and 137 function to amplify the signals fed thereto.

The simplified circuit and frequency meter of Figure 7 provides a simple means for securing a polyphase output from a single phase source and for maintaining the individual phases of the output substantially uniform over a relatively wide range of frequency. This output interpreted through the synchronous motor and drag cup tachometer provides a simple and accurate measurement of the input frequency within the frequency range of the physical limitations of the synchronous motor.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. In a meter for measuring the frequency of a single phase voltage source, a condenser and resistor connected in series across said source, the reactance of said condenser at low frequency being high compared to said resistance to secure a substantial phase shift at the connection of said resistor to said condenser, a first electronic amplifier tube having a plate, a cathode and a control electrode, an output circuit for said amplifier tube connected to the plate of said tube and said tube having its control electrode fed from said point of connection, the cathode of said tube being effectively connected to ground at the operating frequencies, a second electronic amplifier tube having a plate, a cathode and a control electrode, an output circuit for said second tube connected to the plate of the second tube, said cathode of the second tube being effectively connected to ground at the operating frequencies, and a coupling capacitor of low reactance at low frequency feeding the control electrode of said second tube from the output circuit of said first tube, a two phase synchronous motor having one of its phases fed from the output of said second electronic tube, a third electronic amplifier tube having a plate, a cathode and a control electrode, an output circuit connected to said plate of said third tube, the cathode of said third tube being effectively connected to ground at the operating frequencies, the control electrode of said third tube being fed from said voltage source, a fourth electronic amplifier tube having a plate, a cathode and a control electrode, an output circuit connected to said plate, the cathode of said fourth tube being effectively connected to ground at the operating frequencies and a coupling capacitor of relatively high reactance at the said low frequency connected between the control electrode of said fourth tube and the output circuit of said third tube, the second phase of said synchronous motor being fed from the output of said fourth tube, and a magnetic tachometer calibrated in indicia of frequency driven by said synchronous motor, the magnitude of said coupling capacitors being selected so as to reduce the variations of the voltages fed from the output circuit of said second and fourth tubes into said phases of said synchronous motor with change of frequencies within a limited frequency range.

2. In a meter for measuring the frequency of a single phase voltage source, a condenser and resistor connected in series across said source, the reactance of said condenser at low frequency being high compared to said resistance to secure a substantial phase shift at the connection of said resistor to said condenser, a first electronic amplifier tube having a plate, a cathode and a control electrode, an output circuit for said amplifier tube connected to the plate of said tube and said tube having its control electrode fed from said point of connection the cathode of said tube being effectively connected to ground at the operating frequencies, a second electronic amplifier tube having a plate, a cathode and a control electrode, an output circuit for said second tube connected to the plate of the second tube, said cathode of the second tube being effectively connected to ground at the operating frequencies, and a coupling capacitor of low reactance at low frequency feeding the control electrode of said second tube from the output circuit of said first tube, a two phase synchronous motor having one of its phases fed from the output of said second electronic tube, a variable potentiometer connected across said source, a third electronic amplifier tube having a plate, a cathode and a control electrode, an output circuit connected to said plate of said third tube, the cathode of said third tube being effectively connected to ground at the operating frequencies, the control electrode of said third tube being fed from said voltage source through said potentiometer, a fourth electronic amplifier tube having a plate, a cathode and a control electrode, an output circuit connected to said plate, the cathode of said fourth tube being effectively connected to ground at the operating frequencies and a coupling capacitor of relatively high reactance at the said low frequency connected between the control electrode of said fourth tube and the output circuit of said third tube, the second phase of said synchronous motor being fed from the output of said fourth tube, and a magnetic tachometer calibrated in indicia of frequency driven by said synchronous motor, said potentiometer being set to secure substantially equal outputs from said second and fourth tubes at minimum frequency, the magnitude of said coupling capacitors being selected so as to reduce the variations of the voltages fed from the output circuit of said second and fourth tubes into said phases of said synchronous motor with changes of frequencies within a limited frequency range.

3. A circuit for producing a two phase output from a single phase source comprising a condenser and resistor connected in series across said source, the reactance of said condenser at low frequency being high compared to said resistance to secure a substantial phase shift at the connection of said resistor to said condenser, a first electronic amplifier tube having a plate, a cathode and a control electrode, an output circuit for said amplifier tube connected to the plate of said tube and said tube having its control electrode fed from said point of connection the cathode of said tube being effectively connected to ground at the operating frequencies, a second electronic amplifier tube having a plate, a cathode and a control electrode, an output circuit for said second tube connected to the plate of the second tube, said cathode of the second tube being effectively connected to ground at the operating frequencies, and a coupling capacitor of low reactance at low frequency feeding the control electrode of said second tube from the output circuit of said first tube, a third electronic amplifier tube having a plate, a cathode and a control electrode, an output circuit connected to said plate of said third tube, the cathode of said third tube being effectively connected to ground at the operating frequencies, the control electrode of said third tube being fed from said voltage source, a fourth electronic amplifier tube having a plate, a cathode and a control electrode, an output circuit connected to said plate, the cathode of said fourth tube being effectively connected to ground at the operating frequencies and a coupling capacitor of relatively high reactance at the said low frequency connected between the control electrode of said fourth tube and the output circuit of said third tube, and a two phase circuit fed from the outputs of said second and fourth tubes, the magnitude of said coupling capacitors being selected so as to reduce the variations of the voltages fed from the output circuit of said second and fourth tubes into said phases of said synchronous motor with change of frequencies within a limited frequency range.

4. A circuit for producing a two phase output from a single phase source comprising a condenser and resistor connected in series across said source, the reactance of said condenser at low frequency being high compared to said resistance to secure a substantial phase shift at the connection of said resistor to said condenser, a first electronic amplifier tube having a plate, a cathode and a control electrode, an output circuit for said amplifier tube connected to the plate of said tube and said tube having its control electrode fed from said point of connection the cathode of said tube being effectively connected to ground at the operating frequencies, a second electronic amplifier tube having a plate, a cathode and a control electrode, an output circuit for said second tube connected to the plate of the second tube, said cathode of the second tube being effectively connected to ground at the operating frequencies, and a coupling capacitor of low reactance at low frequency feeding the control electrode of said second tube from the output circuit of said first tube, a potentiometer connected across said source, a third electronic amplifier tube having a plate, a cathode and a control electrode, an output circuit connected to said plate of said third tube, the cathode of said third tube being effectively connected to ground at the operating frequencies, the control electrode of said third tube being fed from said voltage source through said potentiometer, a fourth electronic amplifier tube having a plate, a cathode and a control electrode, an output circuit connected to said plate, the cathode of said fourth tube being effectively connected to ground at the operating frequencies and a coupling capacitor of relatively high reactance at the said low frequency connected between the control electrode of said fourth tube and the output circuit of said third tube, and a two phase circuit fed from the outputs of said second and fourth tubes, the adjustable point on said potentiometer being set to secure substantially equal individual phase outputs at minimum frequency, the magnitude of said coupling capacitors being selected so as to reduce the variations of the voltages fed from the output circuit of said second and fourth tubes into said phases of said synchronous motor with change of frequencies within a limited frequency range.

References Cited in the file of this patent

UNITED STATES PATENTS

| | | |
|---|---|---|
| 2,333,502 | Wickham | Nov. 2, 1943 |
| 2,372,633 | Angold et al. | Mar. 27, 1945 |
| 2,462,630 | Gille | Feb. 22, 1949 |
| 2,472,507 | Andresen | June 7, 1949 |
| 2,524,702 | Hansell | Oct. 3, 1950 |
| 2,604,520 | Andresen | July 22, 1952 |